United States Patent [19]

Voigt et al.

[11] 4,040,862

[45] Aug. 9, 1977

[54] PROCESS FOR MAKING A THERMAL CONVERTING STARCH BY MODIFICATION OF OXIDIZED STARCH WITH ALUMINUM SALTS

[75] Inventors: John E. Voigt; Edward M. Bovier, both of St. Louis County, Mo.

[73] Assignee: Anheuser-Busch, Incorporated, St. Louis, Mo.

[21] Appl. No.: 702,032

[22] Filed: July 2, 1976

[51] Int. Cl.$^2$ .................. C13L 1/08; C08B 31/00
[52] U.S. Cl. .................................... 127/70; 106/210; 106/213; 127/38; 162/135; 162/175; 536/105
[58] Field of Search ................ 127/33, 70, 71, 38; 106/210, 213; 162/135, 175

[56] References Cited

U.S. PATENT DOCUMENTS

| | | | |
|---|---|---|---|
| 2,276,984 | 3/1942 | Kauffmann | 127/33 |
| 2,503,053 | 4/1950 | Kerr | 127/33 X |
| 2,585,651 | 2/1952 | Hart | 127/33 |
| 2,702,755 | 2/1955 | Chaney | 127/70 X |
| 2,754,232 | 7/1956 | Wetzstein | 127/33 |
| 3,117,892 | 1/1964 | Patel | 127/33 |
| 3,515,718 | 6/1970 | Mehltretter | 127/70 X |
| 3,615,786 | 10/1971 | Moskaluk | 127/33 |

*Primary Examiner*—Sidney Marantz
*Attorney, Agent, or Firm*—Gravely, Lieder & Woodruff

[57] ABSTRACT

Process for preparing a thermal converting starch by reacting an alkaline hypochlorite oxidized starch with a water soluble aluminum salt. The treatment provides a starch product which when pasted at high temperatures will degrade to give a low viscosity material. The process includes the steps of slurrying oxidized starch in water and treating the oxidized starch with a water soluble aluminum salt.

9 Claims, No Drawings

PROCESS FOR MAKING A THERMAL CONVERTING STARCH BY MODIFICATION OF OXIDIZED STARCH WITH ALUMINUM SALTS

BACKGROUND OF THE INVENTION

In the paper industry, starch is used as an adhesive in coating compositions. The starch binds the pigment to the paper web and also bonds pigment particles together. Starches which are employed as adhesives in coating compositions are usually modified by one of several methods, such as enzymatic degradation, acid hydrolysis, oxidation, or dextrinization. Each is successful to some degree in producing a starch of a decreased, reduced viscosity for use in coatings.

The effect of starch modification is to alter to some extent the molecular nature of the starch and to permit the control and reduction of starch viscosity.

As the viscosity of a starch suspension is reduced, undesirable side effects also occur. Some of these side effects are discoloration, retrogradation of the converted material, high viscosity if the product is cooled too quickly or stored too long before use, and loss of adhesive strength.

Maurer U.S. Pat. No. 3,475,215 mentions the use of an acid hydrolysis catalyst in combination with hydrogen peroxide as an oxidizing agent in a process for modifying starch for paper coating compositions. If hydrogen peroxide is not used in Maurer's process, the final viscosity is extremely high, too high for use as adhesive in a paper coating composition. Moreover, failure to use hydrogen peroxide also results in excessive retrogradation.

Our co-pending application Voigt and Bovier U.S. patent application Ser. No. 475,619, filed June 3, 1974, U.S. Pat. No. 3,973,985, entitled METHOD OF DECREASING STARCH VISCOSITY DURING PASTING discloses a method of reducing starch viscosity by oxidizing a lightly oxidized starch with ammonium persulfate.

SUMMARY OF THE INVENTION

This invention involves a process for preparing an improved thermal converting starch which, when pasted at high temperatures, will degrade to give a low viscosity material. The process comprises the steps of adding a water soluble aluminum salt to an alkaline oxidized starch, adjusting the pH of the resulting mixture, subjecting the mixture to pressure, and heating the mixture until the starch is pasted.

DETAILED DESCRIPTION

The starch employed in this invention can be any of the known starches such as corn, waxy maize, wheat, potato, tapioca, etc. In the present invention the starch is initially oxidized with sodium hypochlorite with about 1.0% to about 2.0%, preferably 1.6%, available chlorine. Suitable oxidizing agents include sodium hypochlorite and calcium hypochlorite. Any other suitable method known in the art can also be used for the oxidation step. The oxidation should be carried to the extent that is equivalent to a sodium hypochlorite treated corn starch which has been oxidized with about 1.0 to about 2.0% available chlorine. The fluidity of the oxidized starch should be from about 10 to about 60.

After the starch has been oxidized, it is treated with a water soluble aluminum salt. There are three methods in which the aluminum salt can be added to the oxidized starch.

In the first method, the oxidized starch is washed. From about 0.1% to about 1.0%, by weight, water soluble aluminum salt, based on the dry weight of the starch, is added to a starch slurry containing about 20% to 43% dry starch by weight. The slurry is mixed for 30 minutes. The pH is adjusted to about 6.0 to about 7.0, preferably about 6.5, with a dilute solution of sodium hydroxide or sodium carbonate. The starch can then either be filtered, dried, and stored for future use or pasted.

In the second method, the oxidized starch is washed, filtered, and dried. It is then reslurried, the aluminum salt is added, and the pH is adjusted to the same level as in the first method. The mixture is then ready for pasting.

In the third method, the oxidized starch is washed, filtered, and dried. The aluminum salt is then dry blended with the starch. The resulting mixture is reslurried, and the pH is adjusted to the same level as in the first method. The mixture is then ready for pasting.

As mentioned about 0.1% to about 1.0% by weight of aluminum salt based on the weight of the starch may be utilized. Preferably about 0.4% aluminum salt is used. Any of the commercially available aluminum salts which are water-soluble may be used in the present invention. Such salts include aluminum sulfate, aluminum chloride, the alums, and other complex salts that contain aluminum.

The process described in this invention must be carried out in the presence of a sufficient amount of water and must be mixed for a sufficient amount of time in order to insure thorough wetting of the starch and adequate exposure to the aluminum salt. About 1.5 to about 5 parts by weight of water are required per part of dry starch. A mixing time of about 5 to about 30 minutes is required to insure thorough mixing of the aluminum salt with the starch and water prior to pasting.

A temperature of about 85° to about 178° C, preferably 165° C, and a pressure of about 15 psi to about 140 psi is required to paste the starch. The pasting process requires from about 2 to about 30 minutes.

The initial starch slurry in the pasting process can have solids content of about 15 to about 25%. After the starch is pasted and diluted to about 13% solids, it normally has a Dudley viscosity of about 38 to about 60 seconds. When the starch cools, the increase in viscosity is minimal.

TREATMENT OF CORN STARCH WITH SODIUM HYPOCHLORITE

About 20 to 43% by weight starch (dry basis) is mixed with water. The pH of the water-starch mixture is adjusted to 9.0 with a 2% sodium hydroxide solution. From about 1.0 to about 2.0% by weight, based on the dry weight of the starch, available chlorine is reacted at 27° C to 30° C with the starch. Soduim hypochlorite, the source of the available chlorine, is slowly added so as to keep the pH from exceeding 11.0. The reaction is allowed to proceed for 1½ to 2½ hours after addition is complete. The desired fluidity is about 10 to about 60, preferably about 25 to about 60.

The excess chlorine is removed with minimal amounts of solid sodium bisulfite. Complete removal of excess chlorine is indicated by a spot plate test using O-Tolidine. Complete removal of excess chlorine is indicated by no color change of the indicator. The pH of the starch is then adjusted to 6.0 to 7.0 with 36% hydrochloric acid.

EXAMPLE I 100 gm of a starch oxidized with 1.6% available chlorine were slurried in 400 gm of water. Thereupon 0.5% by weight aluminum chloride, based on the weight of the starch, was added, and the resulting solution was mixed for about 30 minutes. The pH of the starch was adjusted to 6.8 with dilute sodium hydroxide.

The mixture was then added to a 2-liter mechanically agitated autoclave. After the slurry reached 165° C at 100 psi, it was held at these conditions for 5 minutes. A sample then taken from the autoclave was diluted to 13% solids level. The Dudley viscosity was 40 seconds at 54.5° C.

EXAMPLE II

The process as described in Example I was repeated with the only exception being that the addition of aluminum chloride was omitted. The Dudley viscosity of a diluted portion of 13% solids level was 54 seconds at 54.5° C. This demonstrates that the final paste product of our invention has a lower viscosity than the pasted product of an oxidized starch of conventional preparation.

EXAMPLE III

A procedure similar to that of Example I was followed. The following additives were used.
1. None (Control: slightly oxidized starch)
2. Aluminum chloride
3. Aluminum sulfate The samples were taken after the slurries had been held for five minutes at 165° C and 100 psi. The samples were diluted with water to 13% solids. The Dudley viscosity was determined at three temperatures in a range of 160° F to 100° F. The results are shown in Table I.

TABLE I

| Sample | Dudley Viscosity (13% Solids) | | |
|---|---|---|---|
| | 160° F | 130° F | 100° F |
| 1. Control | 48 sec | 54 sec | too thick |
| 2. Control + 0.5% AlCl₃ | 37 sec | 40 sec | 43 sec |
| 3. Control + 0.5% Al₂(SO₄)₃ | 38 sec | 40 sec | 43 sec |

The reduced viscosity makes it possible for an improved coating with higher solids to be prepared.

EXAMPLE IV

The following examples show the effect of various levels of aluminum salt on the lightly oxidized starch.

Three separate slurries were prepared by adding 100 gm of lightly oxidized starch (as in EXAMPLE I) to 400 gm of water. 0.1% aluminum chloride was added to one of the slurries. To the second slurry was added 0.25% aluminum chloride. To the third slurry was added 0.5% aluminum chloride. In each case, the percent of aluminum chloride added is percent by weight, based on the weight of the starch. The resulting solutions were mixed for 30 minutes. The pH of each solution was adjusted to 6.8 with dilute sodium hydroxide. The evaluation procedure used in Example I wherein the samples are mechanically agitated in a 2-liter autoclave was followed. Samples were taken from the autoclave and diluted to 13% solids. The results are shown in Table II.

TABLE II

| Sample | Percent AlCl₃ | DUDLEY VISCOSITY (13% Solids) | | |
|---|---|---|---|---|
| | | 160° F | 130° F | 100° F |
| 1 | 0.10 | 45 sec | 49 sec | 81 sec |
| 2 | 0.25 | 41 sec | 44 sec | 52 sec |
| 3 | 0.50 | 37 sec | 40 sec | 43 sec |

EXAMPLE V

A 33% suspension of a starch oxidized with 1.5% available chlorine was prepared. The starch had an alkaline fluidity of 17 mls. 0.4% by weight aluminum sulfate was added to the suspension, and the resulting solution was mixed for 30 minutes. The pH was adjusted to 6.2 with a 15% sodium carbonate solution. The treated starch was then filtered and dried. 100 gm of this aluminum sulfate treated starch were slurried in 400 gm of water. The evaluation procedure used in EXAMPLE I wherein the samples are mechanically agitated in a 2-liter autoclave was followed. Samples were taken from the autoclave and diluted to 13% solids. The results are shown in Table III. A control sample to which no aluminum sulfate had been added was used to demonstrate the effect of the aluminum salt on Dudley viscosity.

TABLE IV

| Sample | DUDLEY VISCOSITY (13% Solids) | |
|---|---|---|
| | 160° F | 130° F |
| Control: oxidized starch + 0.0% aluminum sulfate | 46 sec | 52 sec |
| Oxidized starch + 0.4% aluminum sulfate | 37 sec | 39 sec |

An improved modification process has been provided to produce hot suspensions of modified starch having predetermined desired viscosities. The suspensions remain stable for considerable periods of time.

What is claimed is:

1. A process for preparing starch for use in paper coating compositions comprising the steps of:
   a. forming an aqueous slurry of an unmodified starch,
   b. oxidizing said starch to a degree equivalent to that obtained by oxidizing with about 1.0 to about 2.0% available chlorine,
   c. adding a water-soluble aluminum salt to said oxidized starch, and
   d. adjusting the pH to about 6 to about 7.

2. The process of claim 1 wherein the water-soluble aluminum salt is selected from the group consisting of aluminum chloride, aluminum sulfate, and the alums.

3. The process of claim 1 wherein about 0.1% to about 1.0% (w/w) water-soluble aluminum salt, based on the weight of dry starch, is added.

4. The process of claim 1 wherein the starch oxidizing agent is selected from the group consisting of sodium hypochlorite and calcium hypochlorite.

5. A process for preparing starch for use in paper coating compositions comprising the steps of:
   a. forming an aqueous slurry containing about 20 to about 43% by weight of an unmodified starch,
   b. oxidizing said starch to a degree equivalent to that obtained by oxidizing with about 1.0 to about 2.0% available chlorine, c. adding about 0.1 to about 1.0% (w/w) water-soluble aluminum salt, based on the weight of dry starch, to said oxidized starch, and d. adjusting the pH to about 6.0 to about 7.0.

6. The process of claim 5 including the step of pasting the starch after the pH has been adjusted to between 6.0 and 7.0.

7. The process of claim 6 wherein the aluminum treated oxidized starch is dewatered after the pH has been adjusted to between 6.0 and 7.0, and then reslurried in water prior to pasting.

8. A process for preparing starch for use in paper coating compositions comprising the steps of:
 a. forming an aqueous slurry of an unmodified starch,
 b. oxidizing said starch to a degree equivalent to that obtained by oxidizing with about 1.0 to about 2.0% available chlorine,
 c. washing, filtering, drying said oxidized starch,
 d. dry blending a water-soluble aluminum salt with said dried oxidized starch, and
 e. adjusting the pH to about 6 to about 7.

9. The process of claim 1 wherein the aqueous slurry of unmodified starch contains about 20 to about 43% by weight of the unmodified starch.

* * * * *